United States Patent [19]

Ozaki

[11] 4,263,818

[45] Apr. 28, 1981

[54] SHIFT LEVER DEVICE FOR USE WITH A BICYCLE

[75] Inventor: Nobuo Ozaki, Osaka, Japan

[73] Assignee: Maeda Industries, Ltd., Osaka, Japan

[21] Appl. No.: 54,178

[22] Filed: Jul. 2, 1979

[30] Foreign Application Priority Data

Jul. 3, 1978 [JP] Japan .................. 53-92145[U]

[51] Int. Cl.³ .............................................. G05G 5/18
[52] U.S. Cl. ........................................ 74/475; 74/489; 74/526; 74/527
[58] Field of Search ............... 74/475, 488, 489, 526, 74/527

[56] References Cited

U.S. PATENT DOCUMENTS

| 2,534,566 | 12/1950 | Yapp | 74/475 X |
| 3,378,662 | 4/1968 | Sorenson | 74/527 X |
| 3,742,580 | 7/1973 | Sullivan, Jr. | 74/489 X |

*Primary Examiner*—Allan D. Herrmann
*Attorney, Agent, or Firm*—Birch, Stewart, Kolasch & Birch

[57] ABSTRACT

A shift lever device for use with a bicycle comprises a bracket having a pair of spaced walls, a stepped slide shaft slidably mounted on the bracket and formed with a plurality of stepwise reduced cylindrical sections of different diameter, a push-button mounted to one end of the slide shaft, a coil spring interposed between the push-button and one of the pair of walls for urging the slide shaft in one direction, and a lever pivotally mounted on a support shaft supported by the bracket. A base portion of the lever is interposed between the pair of spaced walls and provided with a contact surface which is operatively contactable with a selected one of the plurality of stepwise reduced cylindrical sections of the stepped slide shaft.

9 Claims, 4 Drawing Figures

SHIFT LEVER DEVICE FOR USE WITH A BICYCLE

BACKGROUND OF THE INVENTION

This invention relates to a shift lever device for use with a bicycle, and more particularly to a gear shift lever device for shifting a bicycle drive chain from one size sprocket to another size one in cooperation with a rear derailleur.

In a bicycle equipped with a multiple freewheel having a plurality of different size sprockets and a rear derailleur, the chain shifting is generally performed by pulling or releasing a tensioned flexible cable which is operatively connected at one end to the shift lever device mounted on a handlebar or the like and at the other end to the rear derailleur supported by a certain portion of a bicycle frame adjacent to the freewheel. As is well known in the art, the gear shift lever device is basically different from a brake lever device in such a point that the latter has an automatic return system for releasing and thus requires only oneway positive manipulation for braking, whereas the former must be positively manipulated pivotally in opposite directions by overcoming a certain amount of friction and tension force imposed thereon. Thus, in operation, a cyclist must remove his hand from the handlebar, which is likely to cause less safety and control of the bicycle.

The general idea of designing the shift lever so as to permit manipulation without a cyclist's removing his hand from a handlebar has been proposed, for instance, in U.S. Pat. No. 3,742,777 to Mathauser and also in U.S. Pat. No. 3,972,247 to Armstrong. According to Mathauser, a hydraulically operated mechanism with a pivotal lever is employed, while according to Armstrong, a ratchet mechanism with a pivotal lever is employed. According to the present invention, however, a slide shaft mechanism with a push-button is employed for easier manipulation and simpler construction.

Therefore, an object of the present invention is to provide an improved shift lever device of novel construction which can be mounted on a bicycle handlebar so that a cyclist can manipulate it without removing his hand from the handlebar.

Another object of the invention is to provide an improved shift lever device which is relatively simple and compact in construction, easy to manipulate, efficicent in use and inexpensive to manufacture.

A further object of the invention is to provide an improved shift lever device which is provided with a slide shaft and push-button system.

Still a further object of the invention is to provide an improved shift lever device which facilitates shifting the gears in one way by a single stroke of a lever and in the other way in a step-by-step fashion by operation of a push-button.

Other objects, features and advantages of the present invention will become more apparent from the following detailed description taken in connection with the accompanying drawings; it should be understood, however, that the detailed description and specific example, while indicating preferred embodiments of the invention, are given by way of illustration only, since various changes and modifications within the spirit and scope of the invention will be apparent to those skilled in the art from this detailed description.

DESCRIPTION OF THE PREFERRED EMBODIMENTS

Figure 1:
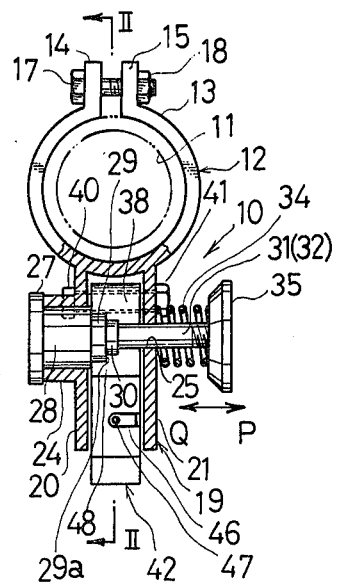
FIG. 1 is a sectional view of the shift lever device according to the present invention, wherein the shift lever is in one operating position.

Referring now to the drawings, in particular to FIGS. 1 to 4, there is illustrated the shift lever device generally designated by reference numeral 10 mounted on a bicycle handlebar 11 shown in phantom lines. The device 10 has a known clamping means 12 by which the device 10 is fixedly mounted on the handlebar. The clamping means 12 may be, for example, an embracing member 13 with split ends forming a pair of opposed tabs 14, 15 each having a hole 16. After the embracing member 12 has encircled the handlebar tube 11, a clamp bolt 17 is inserted through the holes 16 and then tightly engaged with a nut 18 for fixing the device 10 to the handlebar 11.

The device 10 has a bracket 19 which includes a pair of opposed walls 20, 21 having a space 22 therebetween. The bracket 19 is rigidly connected with the clamping means 12, for example, by being welded to the embracing member 13. The one wall 20 of the bracket is formed with a bore 23 within which is annular support 24 is rigidly mounted so as to extend outward at right angles from the wall 20. The other wall 21 of the bracket is also formed with a bore 25 in the common axis X with said annular support 24, the diameter of the bore 25 being smaller than the internal diameter of the support 24 of the purpose to be hereinafter described in detail.

A stepped slide shaft 26 has a head or stopper flange 27 formed at one end thereof, an enlarged cylindrical slide section 28 formed adjacent said stooper flange, and a plurality of stepwise reduced cylindrical sections including for example a first reduced cylindrical section 29 with a relatively large diameter, a second reduced cylindrical section 30 with an intermediate size of diameter, and a third or most reduced cylindrical section 31 which has a non-threaded portion 32 and a threaded end portion 33, each cylindrical of the sections 28, 29, 30, 31 being smooth. The number of said plurality of stepwise reduced cylindrical sections may be varied in accordance with the number of sprockets of the freewheel (not shown). For example, in case the number of the sprockets is three, the number of said plurality of reduced sections should also be three, as illustrated in FIGS. 1 thru 4. As a matter of course, in case the number of the sprockets is, for example, five, the number of said sections should also be five.

The diameter of said stopper flange 27 is larger than that of the cylindrical slide section 28. The diameter of said slide section 28 is slightly smaller than the internal diameter of said annular support 24 so that the section 28 can be fitted into the support 24 so as to be smoothly guided thereby.

The diameter of the first reduced cylindrical section 29 is larger than that of the second reduced section 30, while the diameter of the third or most reduced section 31 is smaller than that of said second reduced section 30. The diameter of the bore 25 is slightly than that of the non-threaded portion 32 of said third section 31 so that the non-threaded portion 32 is fitted into the bore 25 so as to be smoothly guided thereby.

Thus, when inserted through the annular support 24 as well as the bore 25, the shaft 26 is slidably supported at its section 28 and portion 32 so as the be axially movable back and forth within the bracket 19. After the shaft 26 has been inserted through the support 24 and the bore 25, a coil spring 34 is mounted so as to surround the third reduced end section 31 which projects out of the bore 25, and then a push-button 35 is engageably mounted on the threaded portion 33 of the shaft. By tightening the push-button 35, the spring 34 is axially compressed by the push-button 35 and the external side surface of the wall 21, so that the spring always exerts an axial resilient force in the direction of an arrow P.

Figure 4:
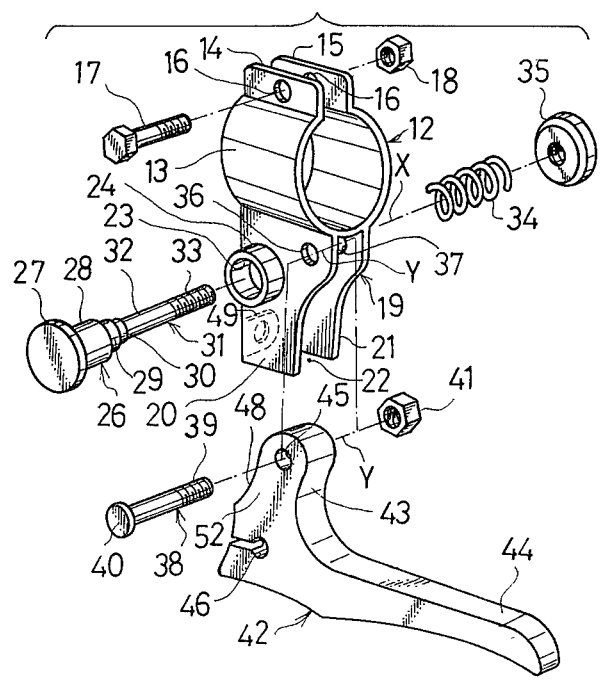
FIG. 4 is an exploded perspective view showing the constituent elements of the invention.

A hole 36 is formed in the wall 20 of the bracket 19, while the other wall 21 is also formed with a hole 37, the holes 36, 37 being in alignment in the common axis Y is shown in FIG. 4. A support shaft 38 is inserted through said holes 36, 37. The support shaft 38 may be in the form of a hinge bolt having a head 39 and a threaded end section 40 to be engaged with a lock nut 41 as shown in FIG. 4.

Figure 2:
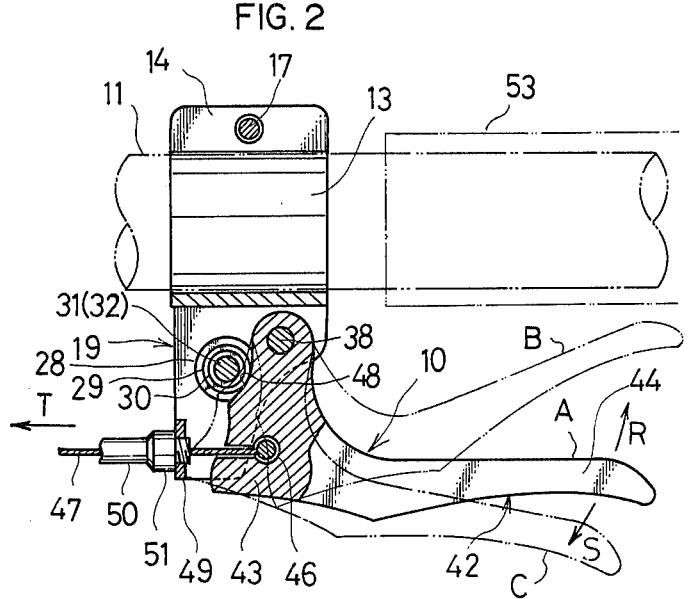
FIG. 2 is a cross section taken along the lines II—II of FIG. 1.

A lever 42 has a base portion 43 and an arm portion 44. The base portion 43 has such a wall thickness as can be disposed between the pair of walls, 20, 21, in other words within the space 22. A through hole 45 is formed in the base portion 43. When assembled, the lever 42 is pivotally supported by the shaft 38 which extends through the holes 36, 45, 37 aligned in the common axis Y. The base portion 43 is formed with a conventional cable fixing means 46 at a position spaced by a certain distance from said through hole 45. The cable fixing means 46 may preferably be a holding recess by means of which one terminal end of the control cable 47 is connected to the lever 42 as shown in FIG. 2. The front wall of the base portion is provided with a contact surface 48 which may preferably be slightly concaved so as to meet the smooth cylindrical surfaces of any one of the three reduced cylindrical sections 29, 30, 31 of the slide shaft 26.

The front end of the alternative of the walls 20, 21 is provided with a support member 49 which extends substantially at right angles to said walls 20, 21. The member 49 may be either an extension integrally formed with one or both of the walls 20, 21 or a separate piece rigidly secured to one or both of the wall 20, 21. One terminal end of a known flexible sheath 50 is connected to the support member 49 by means of a conventional hollow fixing element 51 as shown in FIG. 2. The control cable 47 passes through the inside of the flexible sheath 50, in a conventional manner.

In operation, when the lever 42 in position A of FIG. 2 is pivotally moved against the tension of the cable 47 about the shaft 38 in the direction of an arrow R until the surface 48 disengages from contact with the slide shaft 26 as shown in phantom lines B in FIG. 2, the shaft 26 takes a position shown in FIG. 1 because the shaft 26 is always urged to slide in the direction P by function of the compressed spring 34 until the stopper flange 27 comes into contact with the forward end of the annular support 24. Then, by releasing the gripping force applied by a cyclist to the arm 44, the lever 42 returns to the original position A (FIG. 2) by the tension of the cable 47 which is always pulleed in the direction of an arrow T by function of a known corsion spring incorporated in the rear derailleur (not shown).

In the position of FIG. 1, the contact surface 48 of the lever 42 is in contact with the smooth cylindrical surface of the first reduced cylindrical section 29 of relatively large diameter. At this stage, when the push-button 35 is slightly pushed in the direction of an arrow Q (FIG. 1), the shaft 26 is permitted to axially slide in the same direction until the surface 48 comes into contact with the smooth cylindrical surface of the second reduced section 30 of intermediate diameter with the result that the lever 42 is pivotally moved about shaft 38 in the direction S, whereby the tension of the cable 47 is decreased by a certain predetermined amount. Once said surface 48 comes into contact with the intermediate diameter section 30, the lever 42 is restricted from returning to the original position A since the side wall 52 (FIG. 4) is in abutment with the end wall 29a of the larger diameter section 29. Thus the lever 42 is maintained in the position where the contact surface 48 is in contact with the second section 30 of the shaft 26.

Figure 3:
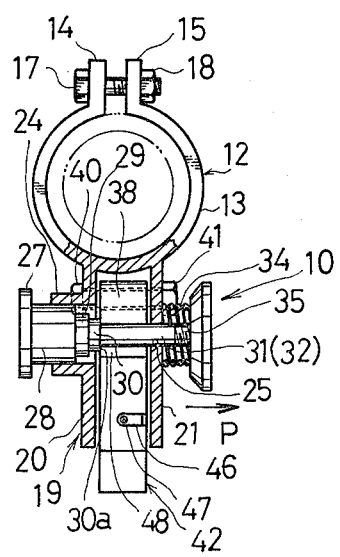
FIG. 3 is a similar view to FIG. 1, wherein the shift lever is in another operating position.

When the push-button 35 is again pushed in the direction Q, the shaft 26 further slides in the same direction until the contact surface 48 comes into the smooth cylindrical surface of the most reduced cylindrical section 31 as shown in FIG. 3 and also shown in FIG. 4 in phantom lines C. Thus, the lever 42 is further moved about the shaft 38 in the direction S, whereby the tension of the cable 47 is further decreased by a certain predetermined amount. In this position of FIG. 3, since the side wall 52 of the lever 42 is in abutment with the end wall 30a of the intermediate section 30, the lever is maintained in the position C shown in FIG. 2.

In order to return the lever 42 from the position C to the position A, the lever arm 44 should be moved in the direction R until the contact surface 48 disenganes from contact with the shaft 26, as already described in the foregoing. By slightly moving the lever arm 44 in the direction R, it is also possible to return the lever 42 from the position C to the intermediate position (not shown) where the contact surface 48 is in contact with the cylindrical surface of the second reduced section 30.

As will be apparent from the foregoing description, the pivotal movement in the direction S of the lever 42 is restricted by the slide 26 having the three reduced cylindrical sections 29, 30, 31 with different diameters. Thus, in the illustrated embodiment, the lever 42 can take three different positions. Accordingly, the illustrated embodiment is applicable to a three-speed bicycle equipped with a three-stage freewheel. However, the scope of the present invention should not be limited to the illustrated example only, since it is readily apparent to those skilled in the art to increase the number of the steps of the stepped slide shaft 26 for a four or more speed system. It is also readily apparent that one of the reduced sections 29, 30 may be omitted for a two speed system. Further, it is also readily apparent that the shift lever device 10 of the invention may be mounted on a suitable bicycle frame other than the handlebar.

When the lever device 10 of the invention is mounted on a bicycle handlebar at a suitable position near the cyclists's handle grip 53 (FIG. 2) so that a cyclist's finger can reach the push-button 35, he can operate the lever arm 44 as well as the push-button 35 without removing his hand from the handle grip 53. Further, a physical force required for pushing the push-button 35 is very small since the friction between the contact surface 48 and each of the smooth cylindrical surfaces of the cylindrical sections 28, 29, 30, 31 is so small. Thus, the cyclist can operate the push-button quite easily at a light touch. By pushing the push-button slightly, the desired gear shift can be carried out in a step-by-step fashion, while by pushing the press-button rather strongly, the chain can be quickly shifted from one extreme position to another extreme position. Also by gripping the lever arm 44 strongly, the chain can be quickly shifted from one extreme position to another extreme position.

The present invention being thus described, it will be obvious that same may be varied in many ways. Such variations are not to be regarded as a departure from the spirit and scope of the present invention, and all such modifications as would be obvious to one skilled in the art are intended to be included within the scope of the following claims.

I claim:

1. A shift lever device for use with a bicycle comprising
    a stepped slide shaft having a plurality of cylindrical sections reducing stepwise in diameter,
    said slide shaft being slidably supported by a bracket which is connected to a clamping means by which said shift lever device is fixedly secured to a bicycle frame,
    a push-button mounted to one end of said slide shaft,
    a compressed coil spring interposed between said push-button and an external wall surface of said bracket for always urging said slide shaft in one axial direction,
    a lever pivotally supported by said bracket so as to move about an axis extending in parallel with said slide shaft,
    said lever having a contact surface which is operatively contactable with a selected one of said plurality of cylindrical sections of the slide shaft,
    said lever having a side surface which restricts said slide shaft from sliding in said one axial direction, and
    said lever being always pulled by a control cable connected thereto so that said contact surface is pressed against said slide shaft and restricted by said slide shaft from pivotal movement in one direction about said axis.

2. The shift lever device, as set forth in claim 1, wherein
    said bracket has a pair of spaced walls, and a base portion of said lever is interposed between said pair of spaced walls.

3. The shift lever device, as set forth in claim 1, wherein
    said stepped slide shaft includes a stopper flange formed at one end thereof, an enlarged cylindrical slide section formed adjacent said stopper flange, and a plurality of stepwise reduced cylindrical sections aligned in a common axis in order of diameter.

4. The shift lever device, as set forth in claim 3, wherein
    said plurality of stepwise reduced cylindrical sections are a first reduced cylindrical section whose diameter is smaller than that of said enlarged cylindrical slide section, a second reduced cylindrical section whose diameter is smaller than that of said first reduced cylindrical section, and a third reduced cylindrical section whose diameter is smaller than that of said second reduced cylindrical section.

5. The shift lever device, as set forth in claims 1 or 4, wherein
    said third or most reduced cylindrical section has a non-threaded portion and a threaded end portion, and said push-button is mounted to said threaded end section by threads.

6. The shift lever device, as set forth in claims 1 or 4, wherein
    said side surface of said lever is engageable with an end wall of said enlarged cylindrical slide section as well as with each end wall of said first and second reduced cylindrical sections.

7. The shift lever device, as set forth in claims 2, 3, or 4, wherein
    a first wall of said pair of spaced walls is formed with a first bore within which an annular support is mounted so as to extend outward at right angles from said first wall, while a second wall of said pair of spaced walls is formed with second bore aligned in a common axis with said first bore and said annular support, an internal diameter of said annular support being larger than a diameter of said second bore,
    said enlarged cylindrical slide section of said stepped slide shaft being slidably supported within said annular support, and
    said third or most reduced cylindrical section of said stepped slide shaft being slidably supported within said second bore.

8. The shift lever device, as set forth in claim 1, wherein
    said lever is pivotally supported by a support shaft supported by said bracket.

9. The shift lever device, as set forth in claim 1, wherein
    said clamping means includes an embracing member with splits ends forming a pair of tabs each having a hole for inserting a clamp bolt therethrough.

* * * * *